US006251490B1

(12) United States Patent
Woodfine et al.

(10) Patent No.: US 6,251,490 B1
(45) Date of Patent: Jun. 26, 2001

(54) COMPOSITIONS OF HIGH DENSITY POLYETHYLENE AND POLY(ETHYLENE NAPHTHALATE)

(75) Inventors: Barry Woodfine; Michael David Thompson, both of Guildford (GB)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 09/361,236

(22) Filed: Jul. 27, 1999

(30) Foreign Application Priority Data

Jul. 27, 1998 (GB) .............................................. 98163454

(51) Int. Cl.⁷ .............................. C08L 23/06; C08L 67/02
(52) U.S. Cl. ................... 428/36.8; 428/35.7; 428/36.92; 525/166; 525/176; 525/177; 264/209.5; 264/564; 264/573
(58) Field of Search .................................... 525/166, 176, 525/177; 428/35.7, 36.8, 36.92; 264/564, 573, 209.5

(56) References Cited

FOREIGN PATENT DOCUMENTS 0 472 898    3/1992   (EP) .

OTHER PUBLICATIONS

Research Disclosure 28313, pp. 643–646, "Poly (Ethylene Naphthalenedicarboxylate) polyolefin Blends", Nov. 1987.

*Primary Examiner*—Patricia A. Short
(74) *Attorney, Agent, or Firm*—Oblon, Spivak, McClelland, Maier & Neustadt, P.C.

(57) ABSTRACT

The invention relates to a polymer blend comprising high density polyethylene (HDPE), poly(ethylene naphthalate) (PEN), and a non-functionalised ethylene copolymer. This polymer blend is useful in extrusion blow moulding to make articles such as bottles.

15 Claims, No Drawings

COMPOSITIONS OF HIGH DENSITY POLYETHYLENE AND POLY(ETHYLENE NAPHTHALATE)

This invention relates to compositions comprising compatibilised mixtures of high density polyethylene, known hereinafter as HDPE, and poly(ethylene naphthalate), known hereinafter as PEN. Compositions of the invention are particularly useful for obtaining products by extrusion blow moulding.

HDPE is a well known and successful bottle forming material for use in the simple one-step extrusion blow moulding process by which the largest proportion of plastic bottles and similar containers are manufactured. HDPE also possesses a number of good properties required in finished bottles, such as hot-fill capability, chemical resistance, impact on $H_2O$ barrier. The main drawbacks of HDPE bottles are poor gas barrier, poor uv barrier and a lack of transparency. In an attempt to overcome the poor gas/uv barrier properties, bottles incorporating a layer of polymer with good gas and/or uv barrier properties surrounded by layers of HDPE have been produced. However, such multi-wall bottles have to be produced by the more complex and expensive co-extrusion blow moulding technology. Also, the barrier polymers used, typically nylon and the like, are incompatible with HDPE and generally require the addition of tie layers to prevent delamination of the bottle wall. This further increases the complexity and cost of such multi-wall HDPE bottles. It would be preferable therefore to develop a composition based on HDPE which can be used in the one-step extrusion blow moulding process.

PEN is a polyester with a high hot-fill capability, similar to HDPE. PEN also possesses good gas/uv barrier properties and better environmental stress cracking resistance than HDPE. Thus, PEN appears to be a good material to combine with HDPE to enhance the poor barrier properties of HDPE bottles without compromising the good properties of HDPE. However, PEN bottles cannot be produced by simple extrusion blow moulding. PEN polymer requires the use of the more complex two-step injection stretch blow moulding process where a preform is first injection moulded and then stretch blow moulded to produce the final bottle. This is the same process as is used to produce bottles of the related polyester, poly(ethylene terephthalate) or PET.

Also, it is widely known that polyesters are incompatible with HDPE at levels greater than –15% by weight. At levels >15%, the HDPE/polyester blend must contain a third component, which acts to compatibilise the blend, in order for the blend to be useful in blow moulding applications. The prior art teaches that ethylene copolymers can be useful for compatibilising HDPE/PET blends, but only if the copolymer contains a reactive functional group for compatibilisation. Functionalised ethylene copolymers used in the prior art include ethylene-methacrylate and ethylene-acrylate copolymers (EA copolymers) which contain various types of functional group. Examples of these reactive functional groups include epoxy or glycidyl groups [see for example U.S. Pat. No. 5,296,550 (to Enichem S.p.A.), EP 540,120 (to Instituto Guido Donegani S.p.A. and Enichem S.p.A.), EP 535,744 (to Instituto Guido Donegani S.p.A.), and the work of Dagli & Kamdar in Polymer Engineering & Science 34 (1994) pages 1709–1719], isocyanate groups [see for example U.S. Pat. No. 5,436,296 (to Allied Signal Inc.)] or carboxylic acid or acid anhydride groups [see for example EP 794,228 (to Toray Industries Inc) and the work of Park, Park, Cho, Ha & Kwon in Polymer Recycling 2 (1996) pages 283–289 and Kumaravel & Jabarin in Advances in Polymer Technology 15 (1996) pages 191–204].

JP-A-48-47,942 (to Teijin Ltd.) claims dimensionally stable MDPE/PEN blends used in injection moulding applications. No compatibiliser was used however, and the more modern prior art suggests that the blends described in JP-A-48-47,942 would not be suitable for processing into bottles or containers by extrusion blow moulding. We confirmed this experimentally (see Comparative Example 3).

We have sought to provide homogeneous HDPE/PEN compositions which are suitable for bottle production using the simple one-step extrusion blow moulding process. We have surprisingly found that non-functionalised ethylene copolymers can be used effectively for compatibilising HDPE/PEN blends.

The present invention provides a polymer blend comprising high density polyethylene (HDPE), poly(ethylene naphthalate) (PEN), and a non-functionalised ethylene copolymer.

The non-functionalised ethylene copolymer is a copolymer of ethylene and an unsaturated acid ester, preferably an acrylate or methacrylate. Non-functionalised means that there should essentially be no groups present in the copolymer capable of reacting chemically with either HDPE or PEN under the conditions typically experienced by polymers during processing operations. The proportion of ethylene in the copolymer is generally at least 50% and preferably 75–85% on a molar basis. The acrylate or methacrylate is preferably of the general formula:

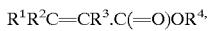

where $R^1$, $R^2$, $R^3$, $R^4$ may be H, alkyl (e.g. $C_1$–$C_6$ alkyl) or aryl (e.g. phenyl) substituents. The preferred substituents are H or $CH_3$.

The ratio by weight of HDPE:PEN in the blend is generally from 80:20 to 20:80, preferably from 70:30 to 50:50.

The proportion of non-functionalised ethylene copolymer in the blend is generally from 1 to 20 wt %, preferably from 5 to 15 wt %, more preferably from 7.5 to 12.5 wt %, based on the total blend.

The essential feature of the invention is the presence of a non-functionalised ethylene copolymer in the blend to provide compatibility between the HDPE and PEN components. The ethylene copolymer is preferably a copolymer of ethylene and an acrylate or methacrylate entity. The acrylate or methacrylate entity should not contain any significant quantities of reactive functional groups after copolymerisation.

In view of the prior art discussed above, it is surprising that non-functionalised ethylene copolymers such as EA copolymers can be used effectively for compatibilising HDPE/PEN blends as in the present invention.

Furthermore, it is also suprising that the compatibilised blends of the invention can be used in extrusion blow moulding as HDPE:PEN compositions across the range 70:30 to 30:70. The work of Kumaravel & Jabarin cited above specifically teaches that functionalised compatibilisers are necessary for the extrusion blow moulding of medium content HDPE/PET blends.

The invention provides a means of compatibilising HDPE/PEN blends such that bottles can be produced from the blend at compositions which would not normally be suitable for bottle production, ie HDPE:PEN ratios from 80:20 to 20:80. The blends can also be used on extrusion blow moulding machines in the same manner as HDPE. Extrusion blow moulding is the simplest type of bottle production process and leads to advantageous process economics over other types of bottle production technology.

Bottles produced from the blends of the invention retain the excellent hot-fill capability of both the HDPE and PEN components, as evidenced by the levels of crystallinity developed in the bottle wall. The integrity and barrier properties of bottles of the invention are good also.

Typical quantities of various process and product additives, such as pigments and the like, can be incorporated into the blends of the invention without substantially affecting the compatibilisation of the blend. The blends may also contain quantities of fibrous and particulate fillers without any significant adverse effects on the compatibilisation.

The invention is illustrated by the following Examples.

Comparative Examples 1–3 are Examples 4–12. Mixtures of composition as detailed in the Table were extruded and pelletised using a Prism twin screw extruder. The melt flow of extruded materials was determined according to standard ISO 1133 on a Ceast melt flow test apparatus. Pellets of the extruded materials were also used on a Latymer small-scale extrusion blow moulding machine to produce a number of 250 ml bottles. The ease of bottle fabrication is documented in the Table. Samples appropriate for crystallinity, mechanical property and barrier property measurements were cut from the bottle walls. Crystallinity measurements were made by differential scanning calorimetry. Mechanical property measurements were made according to standard ISO 6239. Gas barrier property measurements were made according to standard ISO 2556 and water barrier according to standard ASTM E-96.

The specific materials used in the Examples are:

PEN—grade 14991 from Eastman Chemical Company.
HDPE—grade NCPE 8331 from Borealis.
EA—ethylene/methyl acrylate copolymer grade SP-2205 from Chevron Chemical Company.

| Example | 1 | 2 | 3 | 4 | 5 | 6 | 7 | 8 | 9 | 10 | 11 | 12 |
|---|---|---|---|---|---|---|---|---|---|---|---|---|
| Blend composition (wt %) | | | | | | | | | | | | |
| HDPE | 100 | 0 | 50 | 65 | 45 | 25 | 55 | 35 | 40 | 48 | 56 | 62 |
| PEN | 0 | 100 | 50 | 25 | 45 | 65 | 35 | 55 | 40 | 48 | 25 | 32 |
| EA copolymer | 0 | 0 | 0 | 10 | 10 | 10 | 10 | 10 | 20 | 4 | 16 | 4 |
| Melt flow (g/600 sec) | 2.13 | 143.1 | — | 1.43 | 6.83 | 20.86 | — | — | — | — | — | — |
| Bottle forming ability (extrusion blow moulding) | Good | Not possible | Not possible | Good | Good | Fair | Good | Good | Fair | Fair | Good | Fair |
| Crystallinity of bottle (%) | | | | | | | | | | | | |
| HDPE phase | 86.9 | — | — | 87.2 | 80.3 | 79.3 | 84.2 | 79.7 | 77.4 | 80.0 | 86.4 | 83.1 |
| PEN phase | — | — | — | 43.3 | 31.8 | 36.9 | 40.4 | 34.0 | 28.1 | 32.5 | 37.9 | 33.2 |
| Bottle wall properties | | | | | | | | | | | | |
| axial strength (MPa) | 18.4 | — | — | 13.7 | 17.8 | 31.5 | 21.9 | 15.2 | 19.4 | 17.3 | 17.1 | 14.6 |
| hoop strength (Mpa) | 17.4 | — | — | 14.3 | 20.4 | 34.7 | 25.0 | 16.8 | 23.6 | 19.8 | 19.2 | 16.1 |
| $CO_2$ barrier (cc/100 in$^2$.day.atm) | 168 | — | — | 36 | 4 | 1 | — | — | — | — | — | — |
| $H_2O$ barrier (g/100 in$^2$.day) | 0.5 | — | — | 0.5 | 0.6 | 0.5 | 0.5 | 0.5 | 0.6 | 0.5 | 0.6 | 0.5 |

What is claimed is:

1. A polymer blend comprising high density polyethylene, poly(ethylene naphthalate), and a non-functionalized ethylene copolymer wherein said non-functionalized ethylene copolymer is a copolymer of ethylene and an unsaturated acid ester;

wherein the ratio by weight of HDPE:PEN in the blend is from 80:20 to 20:80; and wherein the non-functionalized ethylene copolymer is present in an amount sufficient to compatibilize the blend.

2. A polymer blend according to claim 1, in which the unsaturated acid ester is selected from the group consisting of an acrylate and a methacrylate.

3. A polymer blend according to claim 2, in which the acrylate or methacrylate is of the general formula:

$$R^1R^2C=CR^3.C(=O)OR^4.$$

where $R^1$, $R^2$, $R^3$, $R^4$ may be H, alkyl or aryl substituents.

4. A polymer blend according to claim 3, wherein the proportion of non-functionalised ethylene copolymer is from 1 to 20 wt %, based on the total blend.

5. A method of making an article, comprising extrusion blow molding the polymer blend of claim 3.

6. An article made by the method of claim 5.

7. A polymer blend according to claim 2, wherein the proportion of non-functionalised ethylene copolymer is from 1 to 20 wt %, based on the total blend.

8. A method of making an article, comprising extrusion blow molding the polymer blend of claim 2.

9. An article made by the method of claim 8.

10. The article according to claim 9, wherein said article is a bottle.

11. A polymer blend according to claim 1, in which the proportion of non-functionalised ethylene copolymer is from 1 to 20 wt %, based on the total blend.

12. A method of making an article, comprising extrusion blow molding the polymer blend of claim 11.

13. A method of making an article, comprising extrusion blow molding the polymer blend of claim 1.

14. An article made by the method of claim 13.

15. The article according to claim 14, wherein said article is a bottle.

* * * * *

UNITED STATES PATENT AND TRADEMARK OFFICE
CERTIFICATE OF CORRECTION

PATENT NO. : 6,251,490 B1  
DATED : June 26, 2001  
INVENTOR(S) : Woodfine et al.

Page 1 of 1

It is certified that error appears in the above-identified patent and that said Letters Patent is hereby corrected as shown below:

<u>Title page,</u>  
Item [30], the Foreign Application Priority Data is incorrect. Item [30] should read as follows:

[30]      Foreign Application Priority Data

Jul. 27, 1998    (GB) ............................ 9816345.4

Signed and Sealed this

Fifth Day of February, 2002

Attest:

*Attesting Officer*

JAMES E. ROGAN  
*Director of the United States Patent and Trademark Office*